(12) United States Patent
Boehm et al.

(10) Patent No.: US 10,228,922 B2
(45) Date of Patent: *Mar. 12, 2019

(54) HYBRID PARALLELIZATION STRATEGIES FOR MACHINE LEARNING PROGRAMS ON TOP OF MAPREDUCE

(71) Applicant: INTERNATIONAL BUSINESS MACHINES CORPORATION, Armonk, NY (US)

(72) Inventors: Matthias Boehm, San Jose, CA (US); Douglas Burdick, San Jose, CA (US); Berthold Reinwald, San Jose, CA (US); Prithviraj Sen, San Jose, CA (US); Shirish Tatikonda, San Jose, CA (US); Yuanyuan Tian, San Jose, CA (US); Shivakumar Vaithyanathan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,722

(22) Filed: Jan. 12, 2016

(65) Prior Publication Data

US 2016/0124730 A1    May 5, 2016

Related U.S. Application Data

(63) Continuation of application No. 14/317,016, filed on Jun. 27, 2014, now Pat. No. 9,286,044.

(51) Int. Cl.
*G06F 9/44* (2018.01)
*G06F 8/41* (2018.01)
*G06F 9/48* (2006.01)

(52) U.S. Cl.
CPC .............. *G06F 8/445* (2013.01); *G06F 8/443* (2013.01); *G06F 8/45* (2013.01); *G06F 8/452* (2013.01); *G06F 9/4881* (2013.01)

(58) Field of Classification Search
CPC .......... G06F 8/452; G06F 8/314; G06F 8/433; G06F 8/453; G06Q 10/06312
(Continued)

(56) References Cited

U.S. PATENT DOCUMENTS

2006/0080285 A1*  4/2006  Chowdhuri ....... G06F 17/30445
2006/0218123 A1*  9/2006  Chowdhuri ....... G06F 17/30445
(Continued)

FOREIGN PATENT DOCUMENTS

JP         2012160013 A      8/2012

OTHER PUBLICATIONS

"Method and Apparatus for Efficient Grouping in MapReduce Applications on GPU" IBM, Nov. 18, 2009. IPCOM000190126D.
(Continued)

*Primary Examiner* — Duy Khuong T Nguyen
(74) *Attorney, Agent, or Firm* — Erik Huestis; Stephen Kenny; Foley Hoag LLP

(57) ABSTRACT

Parallel execution of machine learning programs is provided. Program code is received. The program code contains at least one parallel for statement having a plurality of iterations. A parallel execution plan is determined for the program code. According to the parallel execution plan, the plurality of iterations is partitioned into a plurality of tasks. Each task comprises at least one iteration. The iterations of each task are independent. Data required by the plurality of tasks is determined. An access pattern by the plurality of tasks of the data is determined. The data is partitioned based on the access pattern.

20 Claims, 9 Drawing Sheets

(58) Field of Classification Search
USPC .......................................................... 717/149
See application file for complete search history.

(56) References Cited

U.S. PATENT DOCUMENTS

| | | | |
|---|---|---|---|
| 2008/0222620 A1 | 9/2008 | Little et al. | |
| 2010/0199257 A1* | 8/2010 | Biggerstaff | G06F 8/456 |
| | | | 717/104 |
| 2010/0241828 A1* | 9/2010 | Yu | G06F 8/456 |
| | | | 712/30 |
| 2010/0306733 A1* | 12/2010 | Bordelon | G06F 8/433 |
| | | | 717/106 |
| 2011/0276789 A1 | 11/2011 | Chambers et al. | |
| 2012/0022910 A1 | 1/2012 | Chi et al. | |
| 2012/0023504 A1 | 1/2012 | Noam et al. | |
| 2012/0233486 A1* | 9/2012 | Phull | G06F 9/5083 |
| | | | 713/375 |
| 2013/0024412 A1* | 1/2013 | Gong | G06N 5/00 |
| | | | 706/46 |
| 2013/0144973 A1 | 6/2013 | Li et al. | |
| 2013/0290972 A1* | 10/2013 | Cherkasova | G06F 9/5066 |
| | | | 718/103 |
| 2014/0067738 A1* | 3/2014 | Kingsbury | G06N 3/08 |
| | | | 706/20 |
| 2014/0380266 A1* | 12/2014 | Bornhoevd | G06F 8/20 |
| | | | 717/104 |

OTHER PUBLICATIONS

"Apparatus and Method for Smart Blocking Engine in MapReduce Framework" IBM, Nov. 18, 2009. IPCOM000190127D.

Chen, L. et al., (2012) "Accelerating Map Reduce on a coupled CPU-GPU architecture." AN-13372339.

Lei, L. et al. (2011) "CREST: towards fast speculation of straggler tasks in MapReduce." AN-12440525.

* cited by examiner

HYBRID PARALLELIZATION STRATEGIES FOR MACHINE LEARNING PROGRAMS ON TOP OF MAPREDUCE

BACKGROUND

Embodiments of the present invention relate to parallel execution of machine learning programs, and more specifically to hybrid parallelization strategies for machine learning programs on top of MapReduce.

BRIEF SUMMARY

According to one embodiment of the present invention, a method of and computer program product for parallel execution of machine learning programs are provided. Program code is received. The program code contains at least one parallel for statement having a plurality of iterations. A parallel execution plan is determined for the program code. According to the parallel execution plan, the plurality of iterations is partitioned into a plurality of tasks. Each task comprises at least one iteration. The iterations of each task are independent. First data required by the plurality of tasks is determined. An access pattern by the plurality of tasks of the first data is determined. The first data is partitioned based on the access pattern.

DETAILED DESCRIPTION

Figure 1:
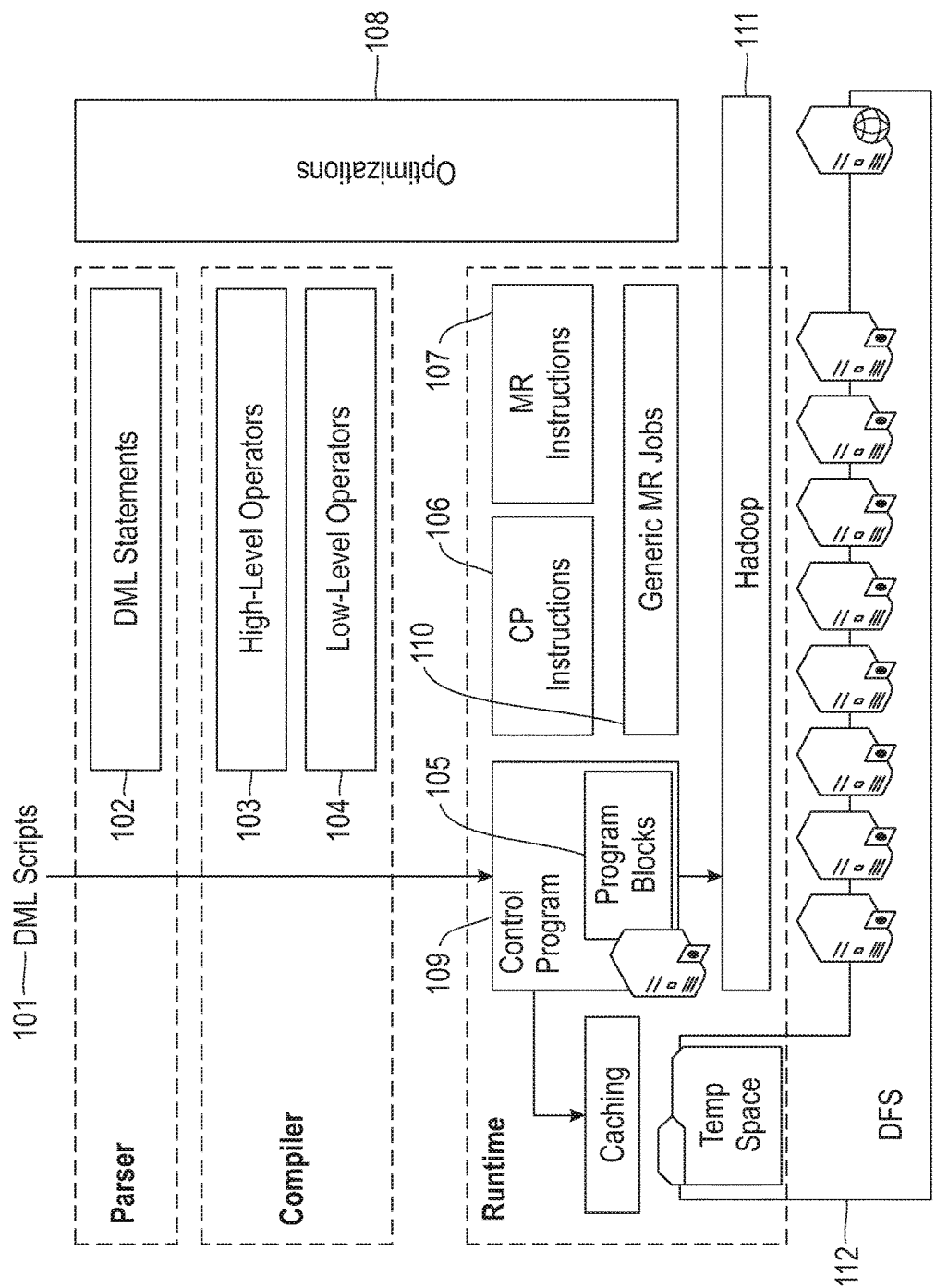
FIG. 1 depicts an exemplary SystemML Architecture according to embodiments of the present disclosure.

Large-scale analytics on top of MapReduce (MR) is becoming more and more important for many organizations in order to gain value from huge amounts of collected data. Declarative machine learning (ML) on top of MapReduce (MR) may exploit data parallelism. The data-parallel MR paradigm does not inherently support task parallelism. However, many use cases in machine learning such as descriptive statistics, cross validation or ensemble learning would benefit from task parallelism. Moreover, requiring the user to choose a task parallelization strategy upfront, i.e., an appropriate large-scale algorithm implementation is often difficult in ad-hoc analysis scenarios. Given a variety of use cases and workloads, there is a strong need for different execution strategies and automatic optimization.

According to various embodiments of the present disclosure, a systematic approach for combining task and data parallelism for large-scale machine learning on top of MapReduce is provided. A dedicated ParFOR (parallel for) construct is employed, such as may be used in high-performance computing (HPC). Optimal parallel execution plans are automatically created during runtime. The present disclosure includes methods for: (a) complementary ParFOR runtime strategies on top of map reduce; (b) access-aware data partitioning and data locality, (c) a memory- and time-based cost model for arbitrary ML programs, and (d) an optimization framework for finding the optimal parallel execution plan of a ParFOR ML program, including a heuristic optimizer as one embodiment of this general optimization framework.

Large-scale data analytics has become an integral part of online services (e-commerce, social media), enterprise data management, system management, and scientific applications (physics, biology, astronomy) in order to gain value from huge amounts of collected data. Finding interesting unknown facts and patterns often requires analysis of a full data set instead of applying sampling techniques. This challenge may be addressed by leveraging parallel programming paradigms such as MapReduce (MR), its open-source implementation Hadoop, or more general data flow abstractions. These frameworks enable large-scale, fault-tolerant, and cost-effective parallelization on commodity hardware. Furthermore, high-level languages may be used in order to overcome the complexity of multiple MR jobs per query. Examples of such languages include Jaql, Pig, and Hive, each of which may compile queries to MR jobs. Thus, these languages may provide low programming effort and good out-of-the-box performance.

In addition to analyzing big data, large-scale analytics is driven by the increasing need for advanced analytics beyond traditional aggregation queries, in terms of machine learning (ML) and content analysis. These analytics range from descriptive statistics to data mining techniques such as clustering, classification, association rule mining, and forecasting. Typical applications are log and sales analysis, recommendations, and user classifications. While statistical tools such as R and Matlab may provide analysis libraries, they are not designed for distributed computing on big data. Integrating such tools into higher-level languages requires that the user to choose a parallelization strategy, i.e., an appropriate large-scale algorithm implementation, upfront, which is often difficult in ad-hoc analysis scenarios.

SystemML enables declarative machine learning. Complex ML algorithms are expressed in a high-level language—including linear algebra operators—called DML (Declarative Machine learning Language) and finally compiled to programs of MR jobs. This is comparable to high-level languages such as Jaql, Pig, and Hive but domain-specific for machine learning. Advantages of this approach include flexible specification of large-scale ML algorithms and automatic cost-based optimization.

An ML system on top of MapReduce faces the following two challenges. First, for small datasets, MR performance is often orders of magnitude worse than parallel in-memory computation. The reasons include distributed operator implementations, distributed/local file system I/O, and MR framework overhead. Second, the data-parallel MR paradigm does not inherently support task parallelism for compute intensive workloads. However, there are many use cases such as descriptive statistics, cross validation, or ensemble learning that would strongly benefit from task parallelism. One challenge is to provide efficiency and scalability for the full spectrum from many small to few very large tasks. Both problems of in-memory computations and task parallelism are inter-related due to memory constraints and can be jointly solved in a generic cost-based optimization framework according to embodiments of the present disclosure.

With reference now to FIG. 1, an exemplary SystemML Architecture according to embodiments of the present disclosure is shown. ML algorithms are expressed in a high-level language with R-like syntax—the Declarative Machine learning Language (DML). DML scripts 101 are parsed to an internal representation of hierarchically structured statement blocks and statements 102, where statement blocks are defined by the program structure. Each statement block is then compiled into DAGs of high-level operators (HOPs) 103, low-level operators (LOPs) 104, and finally to runtime plans of executable program blocks 105 and instructions 106-107. At each step of this compilation process, different optimizations 108 are applied. Examples include constant folding/propagation, common subexpression elimination (CSE), operator ordering, operator selection, recompilation decisions, and piggybacking (packing multiple instructions into a single MR job). At runtime level, the control program 109 executes the hierarchy of program blocks and instructions. Instructions are either CP (control program) instructions 106 that are locally executed in-memory of the master process, or MR instructions 107 that are executed as part of generic MR jobs 110 on a MapReduce cluster 111 such as Hadoop, submitted via MR-job instructions. MR instructions 107 work on blocks of the overall matrix. The exchange of intermediate results between MR jobs 110 and CP instructions 107 is done via file exchange over the distributed file system 112 (e.g., HDFS). A multi-level buffer pool controls this exchange and in-memory matrices. During runtime, there are again several optimizations including decisions on dense/sparse matrix block representations and dynamic recompilation.

In an example illustrating an execution model according to an embodiment of the present disclosure, Pearson's Correlation Coefficient is computed ($r_{X,Y}$=cov(X, Y)/$\sigma_X\sigma_Y$, where X and Y are two m×1 vectors). In DML, the two datasets are read from HDFS, and the standard deviations are computed via the square root of the second central moment, the covariance of X, Y is computed and finally the correlation coefficient is written to HDFS. An exemplary script is provided at Inset 1.

---
Inset 1
---

```
X = read( "./input/X" );
Y = read( "./input/Y" );
m = nrow(X);
sigmaX = sqrt( centralMoment(X,2)*(m/(m−1.0)) );
sigmaY = sqrt( centralMoment(Y,2)*(m/(m−1.0)) );
r = cov(X,Y) / (sigmaX * sigmaY);
write( r, "./output/R" );
```

---

Figure 2:
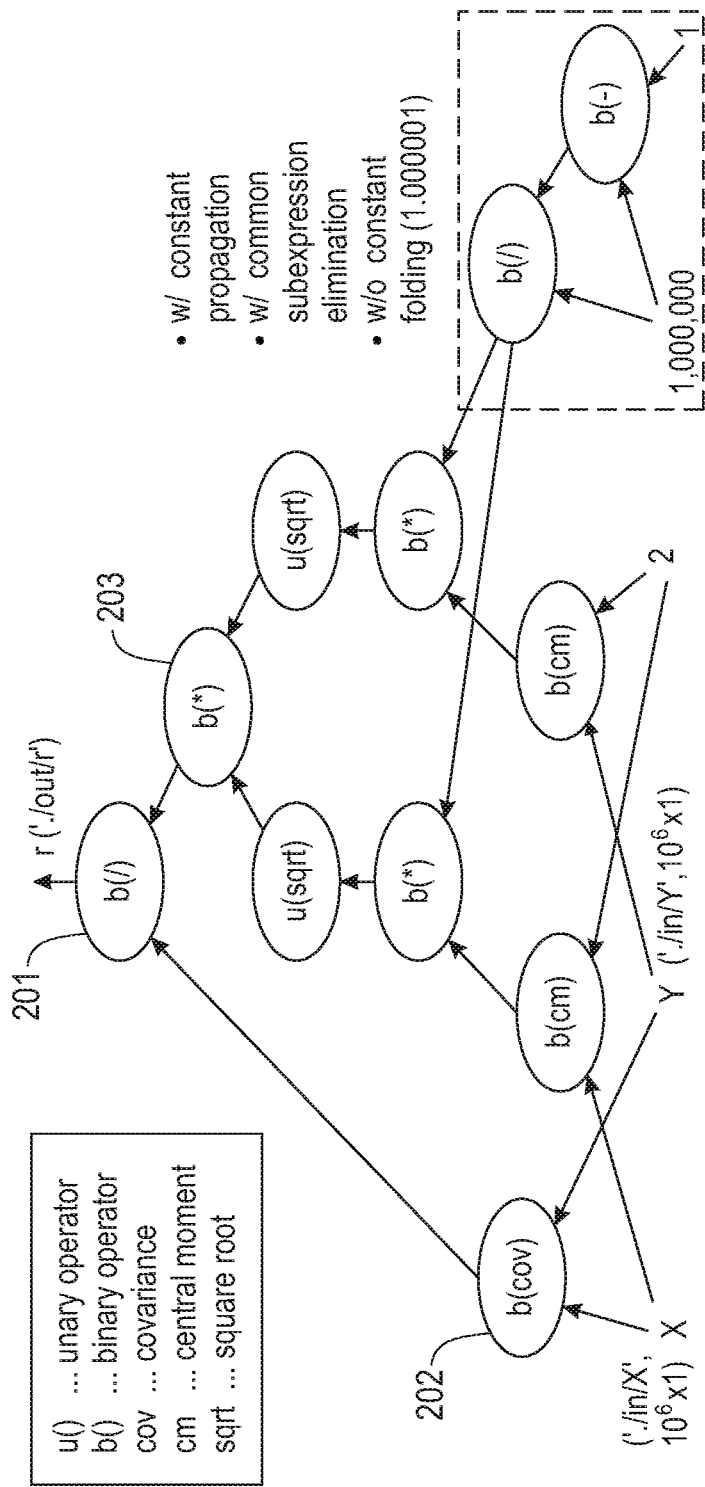
FIG. 2 depicts an directed acyclic graph of high level operators after common subexpression elimination according to embodiments of the present disclosure.

Referring to FIG. 2*, since this script is parsed to a single statement block, a single HOP DAG is created. For example, the statement r=cov(X,Y)/(sigmaX*sigmaY) is compiled to three binary operators (e.g., b(/) 201, b(cov) 202, b(*) 203) as part of this DAG 200. On LOP level, an execution strategy per operator is decided upon. If X and Y fit in memory, those three HOPs may be compiled into a partial LOP DAG of BinaryCP (/), CoVariance, and BinaryCP (*). Otherwise, the HOP b(cov) would be compiled to a LOP chain of CombineBinary (aligns blocks of X and Y) and CoVariance (computes covariance incrementally). Finally, a program block of executable CP/MR instructions is created, in which multiple MR instructions are packed into shared MR jobs. At runtime, this program is sequentially executed with materialized intermediates between instructions.

This execution model exploits data parallelism via MR instructions whenever useful but results in a serial execution of independent tasks such as independent iterations. Hybrid ParFOR parallelization strategies are therefore provided herein for combining both task and data parallelism.

An exemplary taxonomy of task-parallel ML programs is provided in Table 1. This taxonomy provides a basis for reasoning about classes of use cases. In this context, data parallelism refers to operator- or DAG-level parallelization, i.e., executing an operation on blocks of matrices in parallel. In contrast, task parallelism refers to program-level parallelization, i.e., executing a complex ML program on iterations in parallel. The taxonomy of Table 1 employs two perspectives: model- and data-oriented. First, the model-oriented perspective describes the ML-algorithm-specific statistical model. Multiple (independent) models inherently exhibit large potential for task parallelism. Examples are cross-validation (CV) or ensemble learning (EL). There are also many use cases of single composable models, i.e., decomposable problems and aggregation of submodels that benefit from task parallelism. Example classes are (1) algorithms in statistical query model (SQM) summation form, (2) partitioned matrix factorization via alternating least squares (ALS), expectation maximization (EM), or stochastic gradient decent (SGD), and (3) tree-based algorithms like decision trees or Cascade support vector machines (SVMs). Second, the data-oriented view describes the data access characteristics of iterations, which may use disjoint, overlapping, or all data. Those data categories define applicable optimizations such as partitioning (disjoint/overlapping) and memoization/sharing (overlapping/all).

TABLE 1

| | Single Model | Multiple Models |
| --- | --- | --- |
| Disjoint Data | SQM, Data Gen., SGD | Univariate Stats, Indep. Models |
| Overlap. Data | SQM, C. SVM, ALS, EM, SGD* | Bivariate Stats, Meta, CV |
| All Data | Dist.-based, kNN, EL | Meta, EL |

At the language-level, ParFOR is provided as a high-level DML primitive for task parallelism. To assist in the below discussion of its parallel execution and optimization strategies, a running example of a task-parallel DML script is provided.

Inset 2 provides an extension of the correlation script of Inset 1, providing parallel correlation computation for all n(n−1)/2 pairs of columns of an m×n input matrix D. It will be appreciated that this use case is analogous to cases involving more complex bivariate statistics.

---
Inset 2
---

```
D = read( "./input/D" );
m = nrow( D );
```

Inset 2

```
n = ncol( D );
R = matrix(0, n, n);
parfor( i in 1:(n-1) ) {
     X = D[ ,i];
     m2X = centralMoment(X,2);
     sigmaX = sqrt( m2X*(m/(m-1.0)) );
     parfor( j in (i+1):n ) {
          Y = D[ ,j];
          m2Y = centralMoment(Y,2);
          sigmaY = sqrt( m2Y*(m/(m-1.0)) );
          R[i,j] = cov(X,Y) / (sigmaX*sigmaY);
     }
}
write( R, "./output/R" );
```

The outer ParFOR loop iterates from 1 to (n−1) and computes σ for the first column. Due to symmetry of $r_{X,Y}$, the inner loop only iterates from (i+1) to n in order to compute $r_{X,Y}$ for all pairs of columns. Below, R[i,j]=v and v=D[,i] are referred to as left and right indexing, respectively. The result is an upper-triangular matrix R.

Given a variety of use cases and workloads, there is a strong need for different parallel execution strategies. For example, if there are many small pairs, distributed in-memory computation may be preferable, but if there are few very large pairs, scalable data-parallel computation may be more important. Additional challenges of this example include: (1) a triangular nested loop structure, (2) a column-wise data access on unordered data, and (3) a bivariate all-to-all data shuffling pattern. Thus, complex ParFOR programs and ad-hoc data analysis with unknown input characteristics require automatic optimization.

Given a ParFOR body denoted prog, a ParFOR predicate p=([a, b], z) with lower bound a, upper bound b and increment z, as well as a cluster configuration cc, find a parallel execution plan that minimizes the execution time T with Equation 1, where k is the degree of parallelism, m is the memory consumption, and ck, cm being constraints. Note that the predicate p defines N=[(b−a+1)/z] iterations, where a single iteration executes prog exactly once for a specific value of the index variable and prog(p) must create correct results $$\phi_1 : \min T(\text{prog}(P)) \, s.t. k \leq ck \wedge m \leq cm \quad \text{Equation 1}$$

In order to guarantee result correctness for parallel execution, a loop dependency analysis is applied. Extended HPC compiler techniques are employed. For ensuring determinism and independence, the existence of any inter-iteration (loop-carried) dependencies is disproved. A candidate-based algorithm is applied based on the conceptual framework of linear functions. First, a set of dependency candidates C is collected, where a candidate c∈C is defined as a write to a non-local variable. Second, each candidate c∈C is checked via a sequence of tests (scalar, constant, equals, GCD/Banerjee) against all written and read variables of the ParFOR body. If independence for c cannot be proved, it is added to C'. For range/set indexing, artificial index variables and bounds are introduced according to the given range. By combining this into the linear function, the existing tests can be transparently applied. Third, if C'=∅, there is no loop-carried dependency and the test succeeds; otherwise, an error is raised.

The spectrum of use cases is supported with complementary ParFOR parallelization strategies. They all adhere to the conceptual master/worker pattern: iterations are logically grouped to tasks W, k parallel workers execute those tasks, and finally worker results are merged.

Task partitioning groups iterations to tasks with the contradictory objectives of: (1) low task communication overhead (via few tasks) and (2) good load balance (via many tasks). For example, on MapReduce, task setup can take seconds. However, many tasks may be required to exploit large clusters. Load balancing is crucial because the most time-consuming worker determines the overall execution time. A task $w_i \in W$ may be modeled as a logical group of one or many (sequentially executed) iterations with task size $l_i=|w_i|$, where all iterations of one task are executed sequentially. Additionally, W is defined as a set of disjoint tasks that exactly cover predicate p.

Fixed-size task partitioning creates tasks with constant size $l_i=cl$, which represents a tradeoff between communication overhead and load balancing. One extreme is naïve task partitioning with minimal task sizes of $l_i=1$ that leads to very good load balance but high communication overhead. Another extreme is static task partitioning with maximal task sizes of $l_i=[N/k]$ that leads to very low communication overhead but potentially poor load balance.

Additionally, in some embodiments, a factoring self-scheduling algorithm from the area of HPC is applied. Waves of exponentially decaying task sizes are used in order to achieve low communication overhead via large tasks at the beginning but good load balance via few small tasks at the end. Factoring computes the task size li for the next wave of k tasks, based on remaining iterations $R_i$, as shown in Equation 2, with $x_i=2$ as suggested for unknown variability. As an example, N=101 and k=4 results in a sequence of (13, 13, 13, 13, 7, 7, 7, 7, 3, 3, 3, 3, 2, 2, 2, 2, 1) iterations. For specific scenarios, this may be extended constrained $C^-/C^+$ Factoring that additionally imposes either a minimum constraint $l'_i = \max(l_i, cmin)$ (e.g., for reduced communication overhead) or a maximum constraint $l'_i = cmax$ (e.g., for upper-bounded memory usage). Regarding communication overhead it is noteworthy that |W| increases only logarithmically in N with $O(k \log_x N/k)$.

$$R_0 = N \quad \text{Equation 2}$$
$$R_{i+1} = R_i - k \cdot l_i$$
$$l_i = \left\lceil \frac{R_i}{x_i \cdot k} \right\rceil = \left\lceil \left(\frac{1}{x_i}\right)^{i+1} \frac{N}{k} \right\rceil$$

Factoring differs from guided self-scheduling, as used in OpenMP, in executing waves of tasks with equal size, which is more robust and naturally fits the MR execution model.

For task communication and execution, set and range tasks are supported. Set tasks contain one or many values of the index variable, while range tasks encode a sequence of values via a (from, to, increment)-triple for compression if $l_i > 3$.

Figure 3:
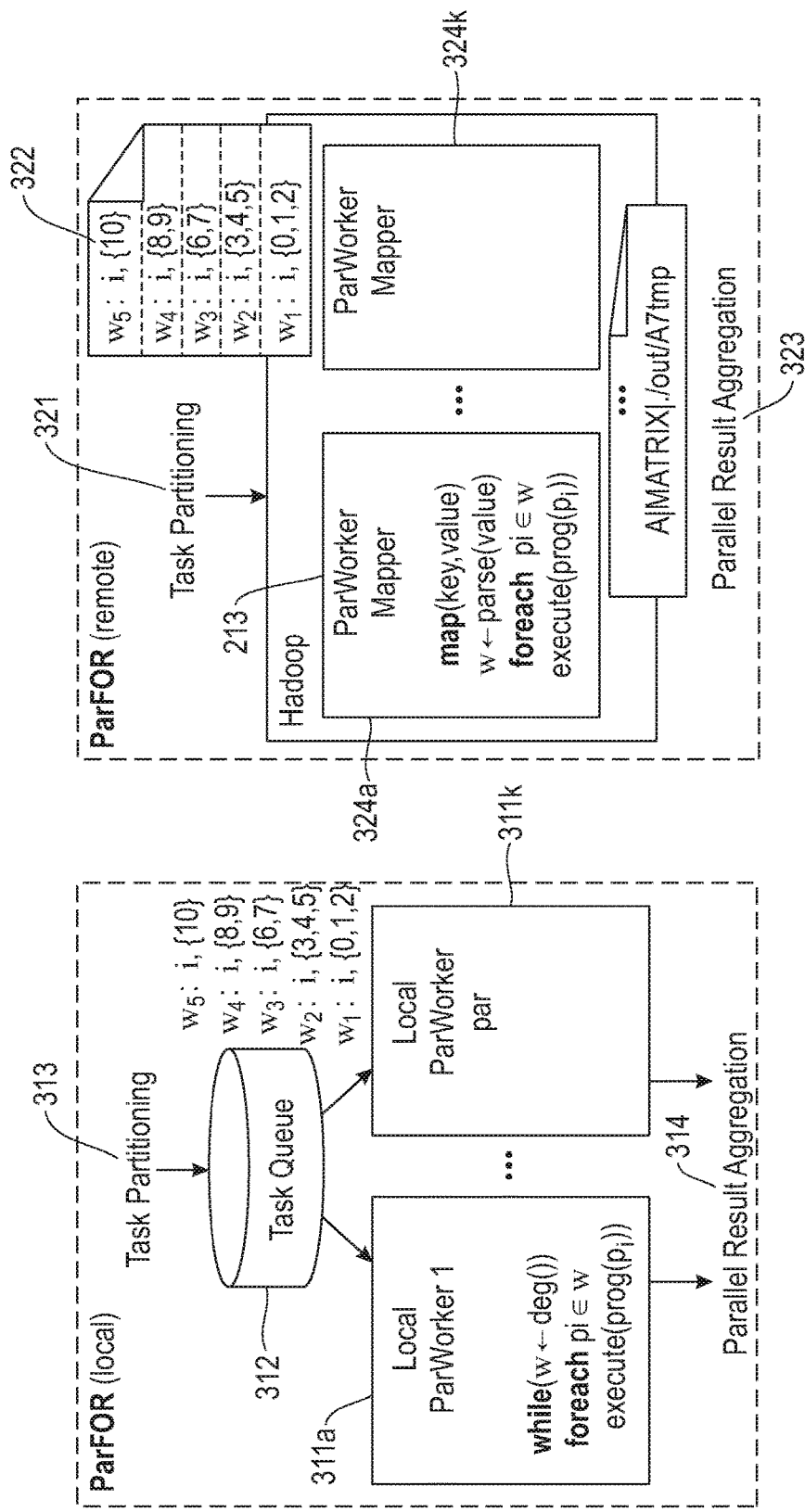
FIG. 3A illustrates the architecture of a ParFOR execution strategy providing local parallelism according to embodiments of the present disclosure.
FIG. 3B illustrates the architecture of a ParFOR execution strategy providing remote parallelism according to embodiments of the present disclosure.

With reference to FIG. 3A, embodiments of the present embodiment include LOCAL ParFOR (ParFOR-L) execution as a first runtime strategy. This runtime strategy addresses the need for generality in terms of task parallelism for arbitrary body programs and arbitrary data sizes. This strategy exploits multicore parallelism by executing tasks concurrently as local threads within the JVM of control program 109 (e.g., SystemML's control program). This enables parallel execution within a single node with very low overhead and its generality allows arbitrary instructions and nested parallelism in the ParFOR body.

FIG. 3A illustrates the runtime architecture of ParFOR-L. First, k parallel workers 311a . . . k are initialized, a task queue 312 is created, and the workers are started as threads that continuously dequeue and execute tasks until no more tasks are available. Second, task partitioning 313 is performed and tasks are enqueued to the task queue 312. Using streaming task creation allows the memory consumption of this task queue to be upper-bounded. Third, all worker threads are joined to wait for finished ParFOR execution. Fourth, all worker results are aggregated 314.

Local Parallel Workers 311a . . . k are continuously running threads that execute one task—and internally one iteration—at-a-time until no more tasks are available in the task queue. Each worker gets a deep copy of the ParFOR body, i.e., program blocks and instructions with unique file-names, and a shallow copy of the symbol table in order to ensure isolated intermediate results. Due to shared address space and copy-on-write semantics in SystemML in some embodiments, a shallow copy of the symbol table is sufficient, i.e., input matrices need not be copied. Every write, then creates a new variable and replaces the reference to the shared variable within the worker-local symbol table.

Task Scheduling assigns tasks to workers and is important for reducing wait times. The single task queue for all tasks of a ParFOR is a self-scheduling approach. Since workers dequeue the next task whenever they finished a task, temporal gaps between task execution are very low. The pull-based task scheduling also leads to a good load balance, which still depends on task partitioning because it determines the scheduling granularity. Finally, this approach reduces the communication and scheduling overhead to a single synchronized dequeue operation per task.

In some embodiments, Dynamic Recompilation re-optimizes HOP DAGs during runtime according to the actual matrix characteristics. This enables handling of initial unknowns. ParFOR-L includes two extensions: First, we evenly divide the context memory budget among the k worker threads. Second, there is the danger of lock contention on the single HOP DAG. Hence, we create deep copies of relevant DAGs for each worker and thus enable concurrent recompilation.

In order to complement the generality of local parallelism (ParFOR-L as described above) with distributed in-memory computation, a second runtime strategy is provided: REMOTE ParFOR (ParFOR-R). In ParFOR-R, ParFOR itself is executed as a single MR job and its body is executed as in-memory CP instructions, distributed on all nodes of the cluster. This ensures scalability for large or compute-intensive problems.

The runtime architecture of ParFOR-R according to embodiments of the present disclosure is shown in FIG. 3B. First, task partitioning 321 is performed, and the task sequence is serialized into a task file 322 on HDFS. Second, all dirty—i.e., not up-to date—required input matrices are exported to HDFS. Third, the ParFOR program body, i.e., program blocks, instructions, and referenced DML/external functions, a shallow copy of the symbol table, and internal configurations are serialized and stored in the MR job configuration. Fourth, the MR job is submitted and its successful execution is awaited. Result matrices of individual tasks are directly written to HDFS but (varname, filename)-tuples are collected in the job output. This ensures output flexibility with fault tolerance. Fifth, results are aggregated 323.

ParFOR-R is a map-only MR job whose input is the task file with one ParFOR task per line. In some embodiments, the NLineInputFormat is used in order to initiate one map task per ParFOR task. The number of map tasks is therefore directly controlled via task partitioning 321, where k is equal to the number of map slots in the cluster.

Remote Parallel Workers 324a . . . k behave like local workers 311a . . . k, except for realizing the MR mapper interface. The worker is initialized by parsing the serialized program and creating program blocks, instructions, and a symbol table with unique file names. On each map, the given task is parsed, the program is executed for all iterations of that task, and result variables are written to HDFS. If JVM reuse is enabled, workers are reused in order to reuse cached input matrices and pre-aggregate results. Finally, MR instructions (nested MR jobs) are not allowed inside a remote worker because this incurs the danger of deadlocks if all map slots are occupied by ParFOR.

In some embodiments, task scheduling is handed over to a MapReduce scheduler (e.g., the Hadoop scheduler). The scheduler provides global scheduling for (1) the task- and data-parallel jobs, as well as (2) other MR-based applications on a shared cluster. This approach provides MR functionality such as fault tolerance, data-locality, and an existing eco-system. In some embodiments, default schedulers such as fifo, capacity and fair schedulers may be used. In other embodiments, custom schedulers may be used. Since Hadoop sorts and executes input splits by decreasing size, in some embodiments we ensure the order of the ParFOR tasks by padding range tasks with leading zeros to a constant size of $\log_{10}(b)+1$, where b refers to the upper bound b of the ParFOR predicate p.

The generality of ParFOR allows the combination of parallel execution models as needed. Exemplary hybrid parallelization strategies are illustrated in FIGS. 4A-C, where hybrid refers to combing (1) task and data parallelism, (2) in-memory and MR computation, and (3) multi-core and cluster parallelism.

Figure 4:
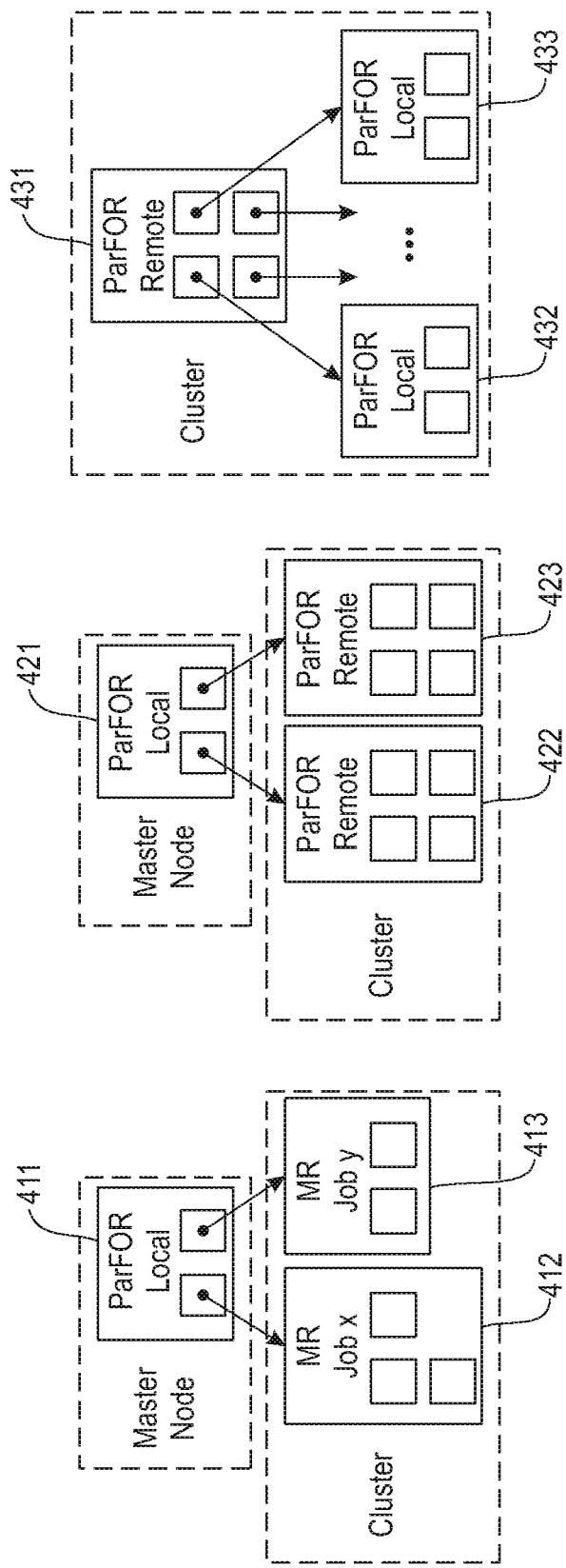
FIGS. 4A-C illustrate exemplary hybrid parallelization strategy according to various embodiments of the present disclosure.

Referring to FIG. 4A, a parallelization strategy for Parallel MR jobs according to an embodiment of the present disclosure is illustrated. If the ParFOR body contains operations on large data, in-memory operations cannot be run via ParFOR-R. However, ParFOR-L 411 exploits multi-core parallelism for CP and MR-job instructions, and hence can run parallel MR jobs 412, 413. This is beneficial for latency hiding and full resource exploitation. In the example of a $10^9 \times 5$ matrix D, i.e., 10 pairs of 2·8 GB each, two nested ParFOR-L instance would be run. Thus, MR jobs for indexing, covariance and central moment of all pairs run in parallel. The best configuration (e.g., number of reducers) depends on the ParFOR degree of parallelism k, and additional piggybacking opportunities across iterations may be possible.

Referring to FIGS. 4B-C, a parallelization strategy for mixed nested parallelism according to embodiments of the present disclosure is illustrated. In the case of nested ParFOR, where only the outer contains an MR-job instruction, ParFOR-R 422, 423 may be used for the inner. This leads to parallel ParFOR MR jobs, in parallel to the MR jobs from the outer. If there are only CP instructions, a ParFOR-R 431 may be used for the outer. Within those map tasks, multi-threaded ParFOR-L 432, 433 may additionally be used for the inner to exploit all resources.

The hybrid parallelization schemes presented in FIGS. 4A-C are exemplary. Alternative hybrid strategies may be adopted without departing from the present disclosure. Hybrid strategies provide the flexibility of creating efficient execution plans for complex ML algorithms.

After local or remote execution, all worker results are consolidated, which contributes to usability and performance. Result variables are the dependency candidates C, i.e., updated, non-local matrices. Independence implies that worker results are disjoint. Two scenarios may be distinguished, in both of which the original result matrix R still exists due to copy-on-write. First, if R is empty, copying all non-zero values from all workers into the final result is all that is necessary. Second, if R is non-empty, copying all (zero and non-zero) values that differ from the original ones must be copied. One example is distributed matrix factorization, where subblocks may be we iteratively modified in parallel. These two cases are referred to as being with and without compare.

In various embodiments of the present disclosure, aggregation may be performed according to several schemes: (1) local in-memory, (2) local file-based, or (3) parallel remote result aggregation. Local in-memory pins R into memory, creates the compare matrix if necessary, and merges all worker results one-at-a-time. This can be done in parallel and lock-free if R is dense; otherwise merging may be performed serially. Local file-based uses a virtual staging file of directly accessible blocks, which can be viewed as a radix sort of blocks. This out-of-core algorithm maps worker result blocks and potentially compare blocks to that structure, and finally merges one result block at-a-time. Parallel remote uses a dedicated MR job whose inputs are the worker results and if necessary the compare matrix. Mappers then tag blocks as data or compare, while reducers get the compare block and then merge one block at-a-time.

The above described runtime already provides high efficiency for compute-intensive workloads. According to various embodiments of the present disclosure, various additional runtime optimizations may be employed for very large input matrices.

For large matrices, i.e., if the memory consumption of an operation exceeds the memory budget of the master node, that operation is executed as an MR instruction in order to ensure robustness. In this case, ParFOR-R cannot be executed, and so at least one MR job is executed per iteration and thus, potentially many MR jobs that repeatedly scan the entire data. While there may often be very large input matrices, individual ParFOR iterations work only on rows, columns or blocks of moderate size. In those scenarios, the MR job for repeated indexed access is one of the most expensive operations. To optimize such scenarios, several strategies are adopted: (1) to transparently partition the input matrix according to the access pattern and (2) to rewrite the body to direct indexed access of partitions.

Data partitioning is only applied for read-only matrices and pure row- or column-wise access patterns. This ensures that no operation other than indexed access is affected. For each input matrix D, all accesses in the ParFOR body are recursively analyzed. If there is a common row-wise or column-wise pattern, this becomes the partitioning scheme. D is then partitioned accordingly into directly accessible files and index accesses are recompiled with a forced execution depending on the partition size.

According to various embodiments, partitioning may be performed as local file-based or parallel remote partitioning, both of which create one SequenceFile per partition. Local file-based is a two-phase out-of-core algorithm that reads the input, appends blocks to a partitioned staging file, and finally creates a partitioned matrix. Parallel remote is a dedicated MR job, where mappers do the partitioning on a block level and reducers write partitions. For high performance of partitioning and read, block-wise partitioning (groups of rows or columns) is also supported, with a block size according to the HDFS block size.

Since ParFOR-R uses a task file as the input, Hadoop cannot co-locate relevant map tasks to the input matrices or partitions. This leads to unnecessary data transfer because, especially on large clusters, data local access become unlikely.

Figure 5:
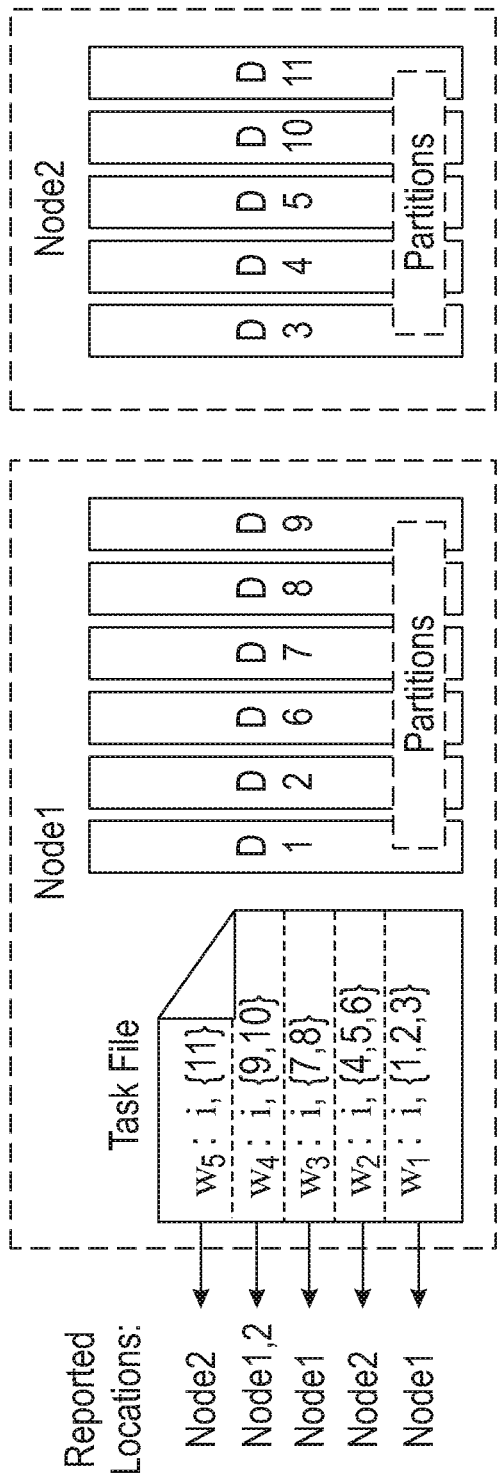
FIG. 5 illustrates exemplary locality reporting according to an embodiment of the present disclosure.

Referring to FIG. 5, exemplary Locality Reporting for X=D[i] is illustrated. Location information of relevant matrices and partitions per logical task is explicitly provided in order to enable data locality. This is provided for the largest partitioned input matrix that is accessed via the iteration variable. A dedicated input format (e.g., a specialized NLineInputFormat) and input split (e.g., a specialized FileSplit) are used. Whenever splits are requested from this input format, the matrix partitioning information is analyzed and a wrapper split is created around each original file split. Instead of reporting the location of the small task file splits: (1) the logical task (one per split) is parsed, (2) locations of all related partition files are determined, (3) frequencies are counted, and (4) the top-k frequent nodes are reported as locations. Since Hadoop treats all reported locations equally, in some embodiments, only the hosts with top-1 frequency are reported as shown in FIG. 5. For range tasks, heuristic analysis is performed only of locations of the first and last iteration because locality is examined serially before job submission.

During initial compilation, important matrix characteristics and the ParFOR problem size N might be unknown. In some embodiments, ParFOR optimization is therefore applied as a second optimization phase at runtime for each top-level ParFOR. The plan representation and related optimization problem may be defined in terms of a plan tree.

A Plan Tree P is a tree of nodes $n \in \mathcal{N}_P$ with height h, modeling ParFOR and its body prog. Inner nodes are program blocks and refer to an unordered set of child nodes c(n), where edges represent containment relationships. Leaf nodes are operations. Nodes have a node type nt, an execution type et, a degree of parallelism k, and specific attributes A. P spans a non-empty set of execution contexts $\varepsilon c_P$, where the root node r(P) and specific et define a context with memory cm—and parallelism $ck_{ec}$ constraints. Shared resources are global constraints.

Figure 6:
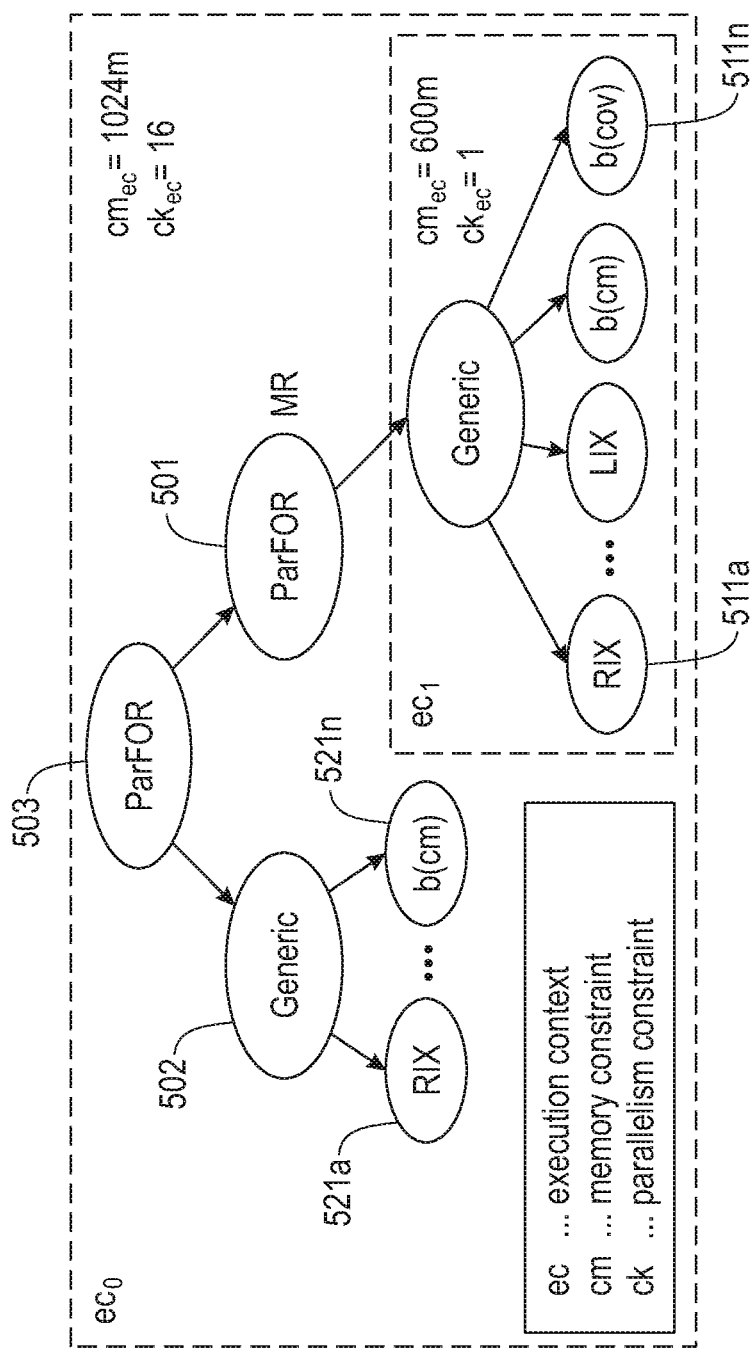
FIG. 6 depicts a plan tree structure according to embodiments of the present disclosure.

Referring to FIG. 6, a plan tree structure may be used to represent arbitrary ParFOR programs. FIG. 6 shows the plan tree P of a running example. Inner nodes refer to ParFOR 501 and generic program blocks 602; leaf nodes 611a . . . n, 621a . . . n refer to operations (HOPs in this case). The root node 603 defines the context of the master process with its constraints (e.g., the max JVM size). Since the nested ParFOR 601 has et=MR, there is a second context of the map task process. There exists a mapping from nodes in P to HOP DAGs and runtime plans.

The plan tree optimization problem may be defined in terms of the plan tree. Given an initial plan tree P, which is assumed to be the optimal sequential plan per program block, transform P into a semantically equivalent plan tree P' that is optimal w.r.t. Equation 3.

$$\phi_2: \min \hat{T}(r(P)) \text{ s.t. } \forall ec \in \varepsilon C_P : \hat{M}(r(ec)) \leq cm_{ec} \wedge K(r(ec)) \leq ck_{ec} \quad \text{Equation 3}$$

Thus, the goal is to minimize the execution time of the plan tree's root node $\hat{T}(r(P))$ under the hard constraints of maximum total memory consumption $\hat{M}(r(ec))$ and maximum total parallelism K(r(ec)) per execution context ec. Valid transformations are node operator selection (et), node configuration changes (k, A), and structural changes of P.

In contrast to alternative query optimization, P covers (1) a complex ML program with control flow, linear algebra operators, task and data parallelism, which require dedicate rewrites and cost modeling, and (2) hard constraints, which require dedicated search strategies and cost estimation.

The plan tree optimization problem is a multiple knapsack problem with multiple constraints, which is known to be NP-hard. Its specific properties are a variable hierarchy of items and knapsacks, as well as multiple variable capacity constraints. In detail, n is an item and $\hat{T}(n)$ is the item value. Each context ec defines a knapsack with constraints $em_{ec}$ and $ck_{ec}$. P with $\varepsilon \in P$ defines the item and knapsack hierarchies, where multiple knapsacks share common constraints (e.g., cluster parallelism).

As a precondition for optimization, a cost model and accurate estimates are required. According to objective $\phi_2$, there are different requirements on those estimates. A soft constraint is imposed on execution time. However, worst-case estimates for memory and parallelism are necessary to guarantee those hard constraints, This is important for preventing out-of-memory situations. Furthermore, the analytical cost model should allow costing arbitrary plan alternatives.

Memory estimation for leaf nodes of a plan tree works on HOP DAGs. Estimates are provided for CP operations as well as block computations in MR. For each DAG, a bottom-up approach of recursively propagating matrix characteristics and estimating memory is used.

Matrix characteristics for memory estimates include the matrix dimensions $d_1$, $d_2$ and the matrix sparsity $d_s$. For worst-case memory estimates, worst-case estimates for those characteristics are also required. Fortunately, many operators of linear algebra (e.g., matrix multiplication) allow to exactly infer their output dimensions. Inferring the sparsity is more difficult due to potential skew but there are, for example, sparsity preserving operations such as $s \cdot X (s \notin 0, NaN, \infty)$. Finally, for unknown characteristics, it is assumed that $d_1 = \infty$, $d_2 = \infty$ and $d_s = 1$.

Based on worst-case matrix characteristics, which have been propagated through the DAG, the output memory $\hat{M}(out(n))$ and operation memory $\hat{M}(n)$ may be computed according to Equation 4, where dense matrices are double arrays and sparse matrices use compressed rows of (column index, value)-pairs. This estimate reflects the runtime model of CP instructions that pin all inputs and outputs in memory. Hence, the memory estimate is the sum of all input, intermediate (depending on intra-operation parallelism k), and output sizes.

$$\hat{M}(n) = \sum_{\forall c \in in(n)} \hat{M}(out(c_i)) + \hat{M}(n, k) + \hat{M}(out(n))$$

$$\hat{M}(out(n)) = \begin{cases} d_1(116B + 12B \cdot d_2 d_s) & \text{sparse} \\ 8B \cdot d_1 d_2 & \text{dense} \end{cases} \quad \text{Equation 4}$$

Figure 7:
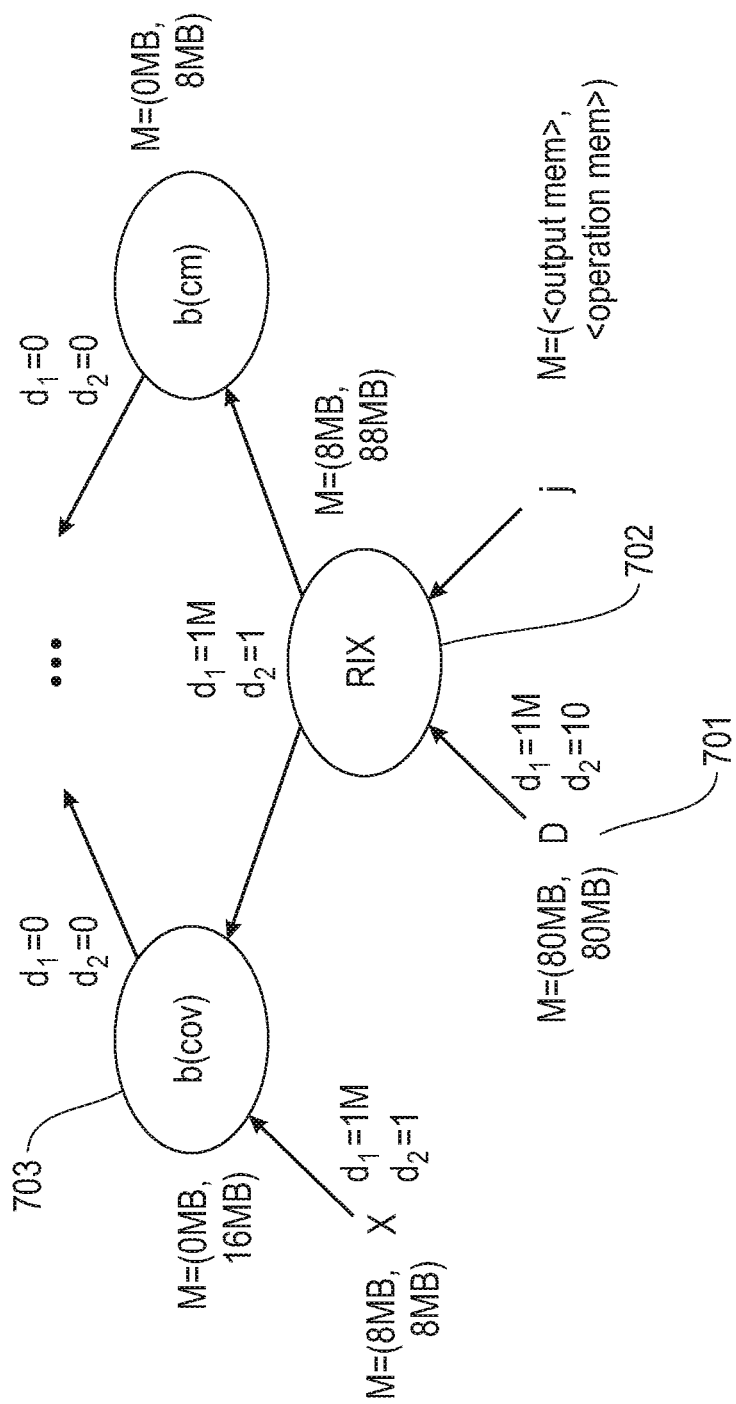
FIG. 7 depicts an exemplary directed acyclic graph of high level operators according to an embodiment of the present disclosure.

FIG. 7 depicts part of the HOPs DAG of the above example's inner ParFOR. Assume a $10^6 \times 10$ input matrix D 701 with sparsity $d_s = 1$. Accordingly, the output size of IX 702 is estimated as 8 MB and the operation memory as 88 MB.

The worst-case memory estimate of a leaf node of P is then defined as the operation memory estimate $\hat{M}(n)$ of its mapped HOP if et=CP and as a constant $M^C$ if et=MR because then it is executed in a separate context.

To make an accurate estimate of time for leaf nodes of a plan tree, runtime properties of operators must be taken into account. Thus, the below detailed approach leverages offline performance profiling of runtime instructions, performed once for a cluster configuration.

Performance profiling measures $\hat{T}$ of all relevant instructions Op for a set of variables V, where we vary one variable $v \in V$ at-a-time. Different execution types and matrix representations are modeled as different instructions. Polynomial regression models are created as cost functions $C_{T,Op}(v)$ for each (v, Op)-combination. The profile is the set of $C_{T,Op}(v)$ for all $v \in V$.

For a request Q with $\forall v \in V: \exists p(v) \in Q$, $\hat{T}$, where $f_x(q_x)$ is a shorthand for $C_{T,Op}(x=q_x)$.

$$\hat{T}(Q, \mathcal{A}) = f_d(q_d, \mathcal{A}) \cdot \prod_{\forall x \in (Q-d)} \frac{f_x(q_x, \mathcal{A})}{f_x(d_x, \mathcal{A})} \cdot corr(Q) \quad \text{Equation 5}$$

Scaling one-dimensional cost functions makes a fundamental independence assumption, which is important for efficient profiling but can lead to low accuracy. Correction terms based on ratios of number of floating point operations are therefore used, e.g., for matrix shape adjustments. This correction enables high accuracy due to a shape-dependent asymptotic behavior. For example, consider a matrix multiplication AB, where each matrix has $10^6$ cells, i.e., 8 MB. Multiplying two 1,000×1,000 matrices requires 2 GFlop, while a dot product of $10^6 \times 1$ vectors requires only 2 MFlop, i.e., a relative difference of $10^3$. Thus, scaled cost functions allow the accurate estimation of time, even for different behavior of dense/sparse operations.

Figure 8B:
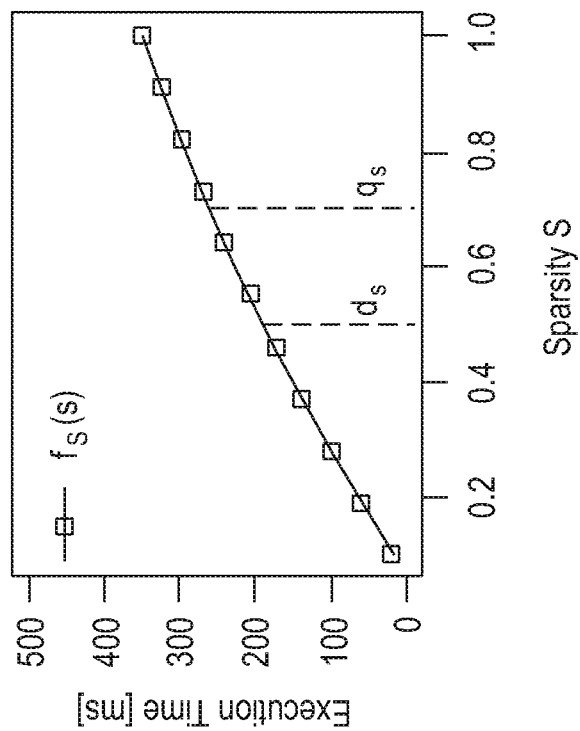
FIGS. 8A-B depict time estimates according to embodiments of the present disclosure.
Figure 8A:
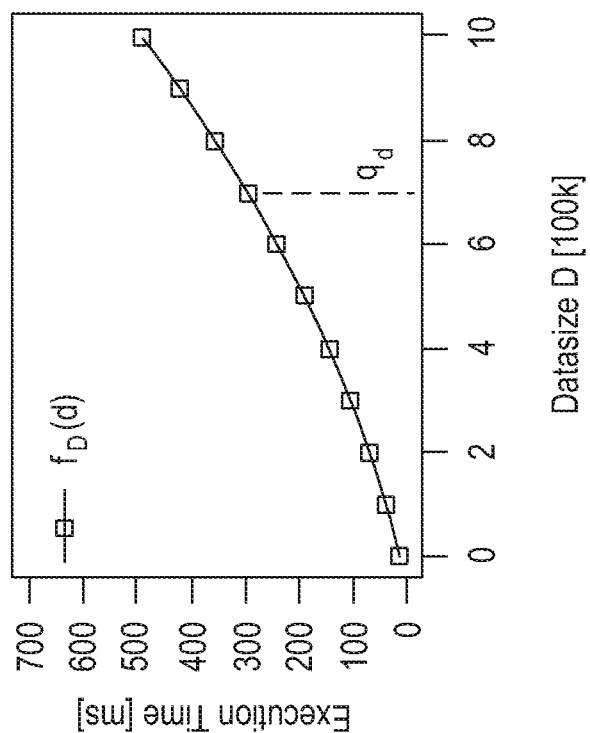
Figure 9:
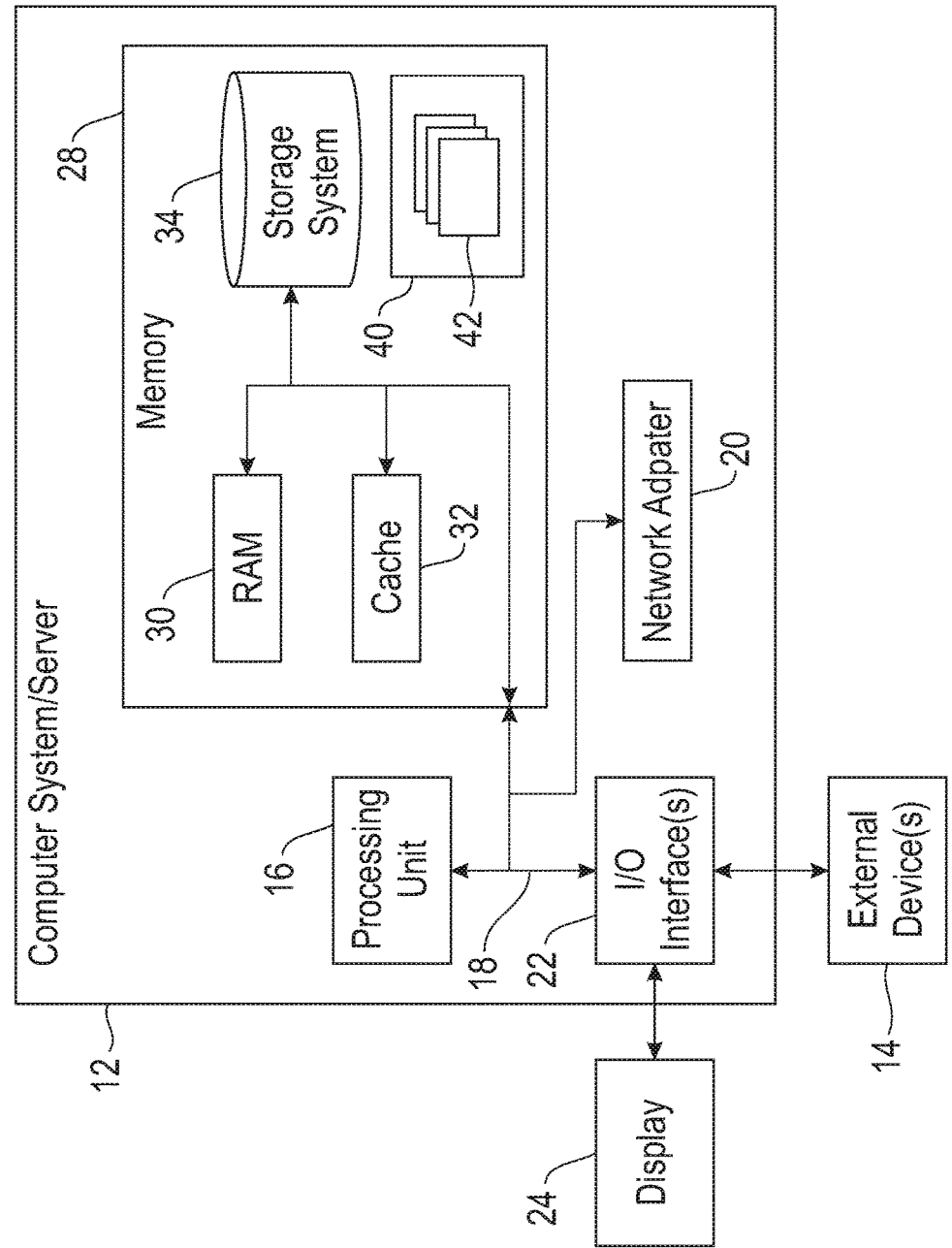
FIG. 9 depicts a computing node according to an embodiment of the present invention.

Referring to FIG. 8, time estimates are depicted according to embodiments of the present disclosure. Assume a query Q with $q_d = 700,000$ ($q_{d1} = 1,000$, $q_{d2} = 700$), and $q_s = 0.7$ for CP, dense, transpose-self matrix multiplication $X^T X$. Further, assume cost functions for datasize $f_D(d)$ and sparsity $f_S(s)$, created with squared matrices and defaults $d_d = 500,000$ and $d_s = 0.5$. First, $f_D$ is picked as the leading dimension, yielding $f_D(q_d) = 325$ ms. Then it is scaled to $\hat{T}(q_d, q_s) = \hat{T}(q_d) \cdot f_s(q_s) / f_s(d_s) = 438$ ms as shown in FIG. 8. Then, a correction is performed: $\hat{T} = (q_d, q_s) \cdot corr(Q)$, yielding $\hat{T} = 366$ ms. Finally, the time estimates are assigned from mapped HOPs and instructions to plan tree leaf nodes again.

Memory and time estimates for arbitrary complex programs may be determined by aggregating leaf node estimates. The worst-case estimate of memory consumption for a ParFOR node is computed with Equation 6 as the number of workers times the most-memory consuming operation since those operations are executed sequentially.

$$\hat{M}(n) = \begin{cases} k \cdot \max_{\forall c \in c(n)} \hat{M} \mid (c) & et = CP \\ M^C & et = MR \end{cases} \quad \text{Equation 6}$$

The memory estimate for all other inner-nodes (for, while, if, func, and generic) is $\hat{M}(n) = \max_{\forall c \in c(n)} \hat{M}(c)$. One challenge is to incorporate shared reads into memory estimates in order to prevent large overestimation. This is done by splitting $\hat{M}$ into shared $\hat{M}^+$ and non-shared $\hat{M}^-$ parts and scaling $\hat{M}^+$ by the number of consumers.

Average-case time estimates are similarly aggregated as the sum of child node time estimates due to sequential execution. In detail, the time estimates are given by Equation 7. Since $\hat{N}$ cannot be determines for while and unknown for/parfor, it is estimated as a constant $\hat{N}=N^C$ there. This reflects at least that the body is likely executed multiple times. Furthermore, the time estimate of an if is a weighted sum because only one branch is executed at-a-time.

$$\hat{T}(n) = w_n \sum_{\forall c \in c(n)} \hat{T}(c), \ w_n = \begin{cases} \lceil \hat{N}/k \rceil & parfor \\ \hat{N} & for, while \\ 1/|c(n)| & if \\ 1 & otherwise \end{cases} \quad \text{Equation 7}$$

Finally, total parallelism is also aggregated with $K(n) = k \cdot \max_{\forall c \in c(n)} K(c)$. For excluding remote parallelism, $K(n)=1$, if et=MR.

According to embodiments of the present disclosure, algorithms are provided for finding optimal parallel execution plans. Due to the large search space, a spectrum of optimizers is provided with different complexity. Each optimizer is characterized by: (1) the used cost model, (2) the rewrites that define the search space, and (3) the search strategy. In the following, a default heuristic optimizer and requirements for more advanced optimizers are provided.

An heuristic optimizer according to embodiments of the present disclosure uses a time- and memory-based cost model without shared reads, heuristic high-impact rewrites, and a transformation-based search strategy with global optimization scope. The time-based cost model enables accurate estimates but requires a pre-created profile. If no profile exists, a memory-based cost model is used and—instead of time estimates—additional heuristic including that local, in-memory computations require less time than their MR alternatives.

The search space is defined by a variety of ParFOR-specific heuristic rewrites. These include rewrites regarding ParFOR parallelization strategies and rewrites exploiting repeated, parallel iteration execution. Examples for ParFOR-centric rewrites include operator selection such as selecting the ParFOR execution type et (CP/MR, i.e., ParFOR-L vs ParFOR-R), task partitioning, and result aggregation methods. Example configuration changes include choosing the degree of parallelism k and task sizes. Structural plan changes include artificial nested ParFOR for multi-threaded map tasks, unfolding ParFOR in recursive functions, and changing ParFOR to for. Second, examples for iteration-aware rewrites include operator selection like data partitioning, where the partitioning format, partitioning method, and execution type are chosen et of left and right indexing. Example configuration changes include choosing matrices for co-location, and changing the partition replication factor r. Most of these rewrites need to take the entire plan tree P into account.

A transformation-based, top-down search strategy may be used that transforms P and its mapped program into P'. This follows the fundamental heuristic to apply available parallelism as high as possible in the plan tree to cover more operations and reduce synchronization. This approach uses a well-defined rewrite order. First, data-flow rewrites are applied that change the memory estimates of P. This includes data and result partitioning because related indexed reads/writes are potentially recompiled to in-memory operations. Second, a recursive decision is made—starting at the root of P—on ParFOR execution type and degree of parallelism. Based on memory constraints and estimates, the maximum parallelism to apply per level can be directly computed.

Third, for all subtrees rooted by ParFOR, execution-type-specific rewrites are applied. For ParFOR-L this includes task partitioner and recompilation budget, while for ParFOR-R this includes data colocation, replication factors, nested ParFOR, and task partitioner. Fourth, result merge strategies are decided on, recursive functions are handled, and unnecessary ParFOR are recompiled to for. The majority of rewrites has a complexity of $c(|\mathcal{N}_P|)$ with exceptions of up to $c(|\mathcal{N}_P|^2)$. This strategy finds the optimal plan according to the heuristically restricted search space but guarantees all constraints of $\phi_2$.

Referring now to FIG. 8, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving program code containing at least one parallel for statement having a plurality of iterations;
   determining a parallel execution plan for the program code;
   according to the parallel execution plan, partitioning the plurality of iterations into a plurality of tasks, each task comprising at least one iteration, the iterations of each task being independent;
   determining an input matrix containing first data required by the plurality of tasks;
   determining an access pattern by the plurality of tasks of the input matrix, the access pattern being determined by recursively analyzing all accesses in the parallel for statement;
   based on the access pattern, partitioning the input matrix;
   providing each of the plurality of tasks to one of a plurality of parallel workers wherein each of the plurality of parallel workers is a MapReduce task or a local thread;
   receiving from each of the plurality of parallel workers a result; and
   aggregating the results from each of the plurality of parallel workers.

2. The method of claim 1, wherein:
   the parallel execution plan is determined at a runtime of the program code.

3. The method of claim 1, wherein determining the parallel execution plan comprises:
   applying an heuristic optimizer.

4. The method of claim 3, wherein the heuristic optimizer comprises a cost model.

5. The method of claim 4, wherein the cost model includes at least one of an execution time of the program code and a memory estimate of the program code.

6. The method of claim 4, wherein the cost model comprises a cost function and the cost function is determined by linear regression.

7. The method of claim 3, wherein applying the heuristic optimizer comprises at least one of:
   selecting an execution type;
   selecting a parallel for execution type;
   selecting data for colocation;
   changing a replication factor;
   selecting a task partitioning method;
   selecting a task size;
   selecting a degree of parallelism;
   replacing parallel for by for;
   selecting an aggregation strategy;
   unfolding recursive functions;
   determining a data access pattern;
   selecting a data partitioning strategy; or
   recompiling indexed reads and indexed writes.

8. The method of claim 1, wherein providing each of the plurality of tasks to one of the plurality of parallel workers comprises:
   determining second data required by a first of the plurality of tasks;
   determining that the second data is locally available to a first of the plurality of parallel workers; and
   providing the first of the plurality of tasks to the first of the plurality of parallel workers.

9. The method of claim 1, wherein partitioning the plurality of iterations comprises performing a loop-dependency analysis.

10. The method of claim 1, wherein at least one of the plurality of tasks reads data from a distributed filesystem.

11. The method of claim 1, wherein each of the plurality of tasks has a size that conforms to an exponential decay function.

12. The method of claim 1, wherein each of the plurality of tasks has a predetermined size.

13. The method of claim 1, wherein the parallel execution plan includes execution of each of the plurality of parallel workers on a single node.

14. The method of claim 1, wherein the parallel execution plan includes execution of each of the plurality of parallel workers on one of a plurality of nodes.

15. The method of claim 1, wherein the program code comprises at least two nested parallel for statements and wherein the plurality of parallel workers comprises at least one MapReduce task and at least one local thread.

16. The method of claim 1, wherein determining the parallel execution plan comprises:
specifying that each of the plurality of tasks be executed either locally or remotely.

17. The method of claim 1, wherein determining a parallel execution plan includes creating a plan representation, the method further comprising:
traversing the plan representation to determine a total estimated runtime;
traversing the plan representation to determine a total memory consumption, wherein:
the parallel execution plan is determined such that it conforms to at least one of a memory constraint or a parallelism constraint.

18. A computer program product for parallelization, the computer program product comprising a computer readable storage medium having program instructions embodied therewith, the program instructions executable by a processor to cause the processor to:
receive program code containing at least one parallel for statement having a plurality of iterations;
determine a parallel execution plan for the program code; according to the parallel execution plan, partition the plurality of iterations into a plurality of tasks, each task comprising at least one iteration, the iterations of each task being independent;
determine an input matrix containing first data required by the plurality of tasks;
determine an access pattern by the plurality of tasks of the input matrix, the access pattern being determined by recursively analyzing all accesses in the parallel for statement;
based on the access pattern, partition the input matrix;
providing each of the plurality of tasks to one of a plurality of parallel workers wherein each of the plurality of parallel workers is a MapReduce task or a local thread;
receiving from each of the plurality of parallel workers a result; and
aggregating the results from each of the plurality of parallel workers.

19. The computer program product of claim 18, wherein:
the parallel execution plan is determined at a runtime of the program code.

20. The computer program product of claim 18, wherein determining the parallel execution plan comprises:
applying an heuristic optimizer.

* * * * *